US000001913H

United States Statutory Invention Registration [19]

[11] Reg. Number: H1,913

Vanetten et al.

[45] Published: Nov. 7, 2000

[54] BI-BLADE CENTURY BANDWIDTH ANTENNA

[75] Inventors: Paul Vanetten, Clinton; Michael C. Wicks, Utica, both of N.Y.

[73] Assignee: The United States of America as represented by the Secretary of the Air Force, Washington, D.C.

[21] Appl. No.: 06/841,381

[22] Filed: Mar. 5, 1986

[51] Int. Cl.[7] ..... H01Q 1/28

[52] U.S. Cl. ..... 343/705

[58] Field of Search ..... 343/705, 708, 343/795, 816, 820–2, 830, 853, 859, 865

[56] References Cited

U.S. PATENT DOCUMENTS

| | | | |
|---|---|---|---|
| 3,015,101 | 12/1961 | Turner et al. | 343/848 |
| 3,509,465 | 4/1970 | Andre et al. | 325/373 |
| 3,618,104 | 11/1971 | Behr | 343/745 |
| 3,680,127 | 7/1972 | Richard | 343/708 |

*Primary Examiner*—Daniel T. Pihulic
*Attorney, Agent, or Firm*—William G. Auton; Donald J. Singer

[57] ABSTRACT

A Bi-Blade Antenna is disclosed which will radiate and receive multi-octave electromagnetic waveforms with century bandwidth (i.e. 100 to 1) using two blade antenna elements and a coaxial transmission line feed. The blade antenna elements each have a comparatively narrow throat, a mid-section called a mouth, and a tip. The two throats are fixed in proximity to each other and are fed by the coaxial line feed. The central conductor of the feed is connected to one throat while the outer coaxial conductor is connected to the second throat. The mouth is formed by an arc of constant radius to result in a low voltage standing wave ratio of about 1.19 to 1.

4 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GEOMETRY OF THE BI-BLADE ANTENNA (J)

GEOMETRY OF THE BI-BLADE ANTENNA

FACSIMILE OF THE ANTENNA SURGE IMPEDANCE THROUGH THE TRANSMISSION LINE AND ANTENNA

DETAILS OF FEEDING THE BI-BLADE ANTENNA WITH A COAXIAL TRANSMISSION LINE

ISOMETRIC VIEW OF VERTICAL ARRAYING OF THE BI-BLADE ANTENNA

BI-BLADE CENTURY BANDWIDTH ANTENNA

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to broadband antennas, and specifically to a bi-blade antenna with century bandwidth (i.e. 100 to 1) which enables it to radiate and receive electromagnetic energy at UHF-Band, L-Band, C-Band, S-Band and X-Band.

The F-111 aircraft contains over 100 separate antennas. This large number of antennas has, up until presently, been considered essential since the aircraft transmits and receives a variety of signals which span many octaves of bandwidth.

The task of providing a single antenna which operates over many spans of bandwidth is alleviated, to some extent, by the systems of the following U.S. Patents, which are incorporated herein by reference:

U.S. Pat. No. 3,680,127 issued to D. J. Richard on 25, Jul. 1972;

U.S. Pat. No. 3,015,101 issued to E. Turner et al on 26, Dec. 1961;

U.S. Pat. No. 3,509,465 issued to Andre et al on 28, Apr. 1970; and

U.S. Pat. No. 3,618,104 issued to L. Behr on Nov. 2, 1971.

U.S. Pat. No. 3,618,104 discloses a broadband low-profile circularly polarized antenna having a form factor comprising a cornucopia-shaped element. U.S. Pat. No. 3,509,465 discloses a tunnel diode amplifier integrated into a printed circuit equiangular spiral antenna in which the antenna elements are used as a portion of the amplifier transmission line.

U.S. Pat. No. 3,680,127 discloses a tunable omnidirectional antenna having two loaded, concentric, semicircular radiating members. U.S. Pat. No. 3,015,101 discloses an antenna consisting of one or more elements each essentially a coplanar equiangular stub antenna with a folded over shorted base, the general configuration being that of a scimitar blade.

While the systems described above are exemplary in the art, the need remains to provide a multi-octave antenna element which has excellent time dispersion properties; and will radiate and receive at UHF-Band, L-Band, C-Band, X-Band, K-Band and beyond. The present invention is intended to satisfy that need.

SUMMARY OF THE INVENTION

The present invention comprises a Bi-Blade antenna which will radiate and receive multi-octave bandwidth waveforms for advanced electromagnetic systems. The antenna is fed with a 50 ohm coaxial transmission line, and may be considered to operate as a transmission line slot in a metal ground plane in the TEM mode of propagation. As a first approximation, the slot width increases lograithmically from the throat to the mouth of the antenna. The tips of the blades of the antenna are approximately a constant radius arc with the radius of the arc determining the slope of the antenna's surge impedance. A phased array antenna may be formed from several Bi-Blade antennas mounted in vertical or horizontal stacks.

It is an object of the present invention to provide a broad-band antenna which transmits and receives multi-octave electromagnetic energy.

It is another object of the present invention to radiate and receive at UHF-Band, L-Band, C-Band, S-Band, and X-Band.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a Bi-Blade Century Bandwidth Antenna which will radiate and receive multi-octave electromagnetic waveforms with century bandwidth (i.e. 100 to 1).

Present state-of-the-art broadband antennas include a few antennas with bandwidths of a decade or more. As for example, two popular antennas are the log-periodic antenna and the cavity backed spiral antenna. In the past, these two antennas have been built with bandwidth's exceeding a decade, and achieving fairly decent spatial patterns with relatively good radiation efficiency. Speaking in general, these antennas have poor VSWR's (voltage standing wave ratio) of 2 to 1 or worse. These antennas also have severe phase dispersion. That is, if the antenna is fed with a very short pulse of an RF carrier (less than several cycles), the radiated electromagnetic waveform will contain severe time and phase dispersion, which causes the radiated waveform to be stretched out in time. Antennas with a century bandwidth (i.e., 100 to 1) are rarely known.

A recent development in the art occurred with the development of a multi-decade antenna entitled "The Mono-Blade Phase Dispersionless Antenna" filed in a U.S. patent application Ser. No. 06/841,376, filed on 5, Mar. 1986 by Michael C. Wickes and Paul Van Etten, now abandoned. The above application is specifically incorporated herein by reference.

The Mono-Blade Antenna, cited above, achieved multi-decade bandwidth using: a metal groundplane, a Mono-Blade Antenna element fixed above the groundplane, and a coaxial transmission line feed which is connected with the element and the groundplane.

The antenna of the present invention is distinct from the Mono-Blade Antenna, and has a number of important properties:

(1) the antenna has a century bandwidth, (2) the antenna has little or no time (phase) dispersion, (3) the input voltage standing wave ratio is extremely good (i.e., less than 1.2 to 1), (4) the geometry is coplanar which provides ideal placement for many system configurations, (5) the antenna is relatively inexpensive to manufacture as compared to other types of broadband antennas, (6) the novel antenna can be employed in a phased array providing a large bandwidth, high gain and good directivity.

Figure 1:
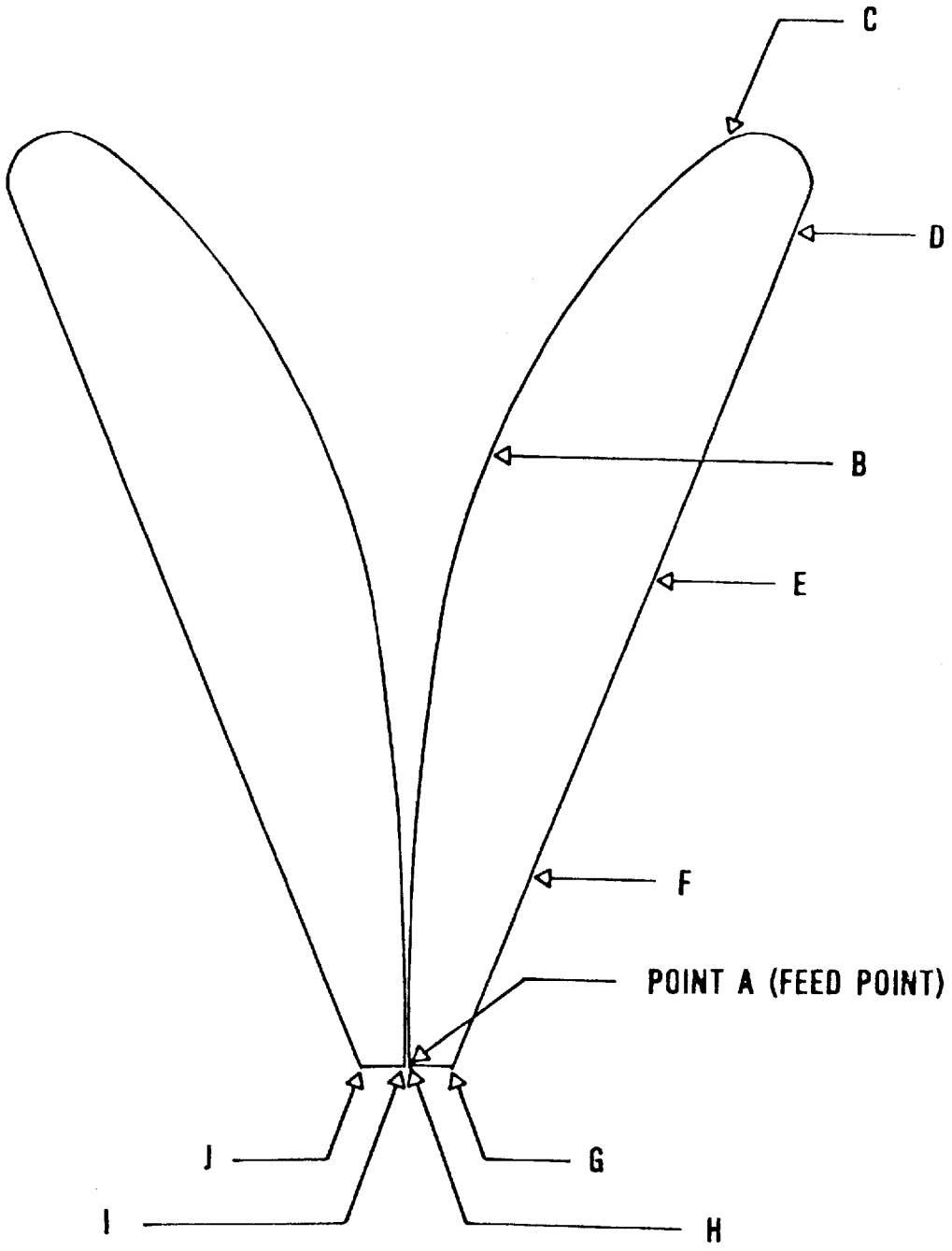
FIG. 1 is an illustration of the geometry of the Bi-Blade Antenna.

The reader's attention is now directed towards FIG. 1, which is an illustration of the geometry of the Bi-Blade Antenna of the present invention. This antenna achieves century bandwidth using two blade antenna elements which are fixed in proximity to each other. The two blades are fed by a single coaxial transmission line feed with its central conductor connected to one blade, and its outer conductor connected to the second blade.

To aid in understanding the theory of operation, consider the antenna to be a transmission line slot in a metal ground plane. The slot transmission line has a TEM mode of propagation. To a first approximation, the slot width increases logarithmically from the throat to the mouth of the antenna. The tips of the blades are approximately a constant radius arc. Because of stray capacity and fringing effects, the actual shape of the opening is determined by the antenna's surge impedance as described below.

Figure 2:
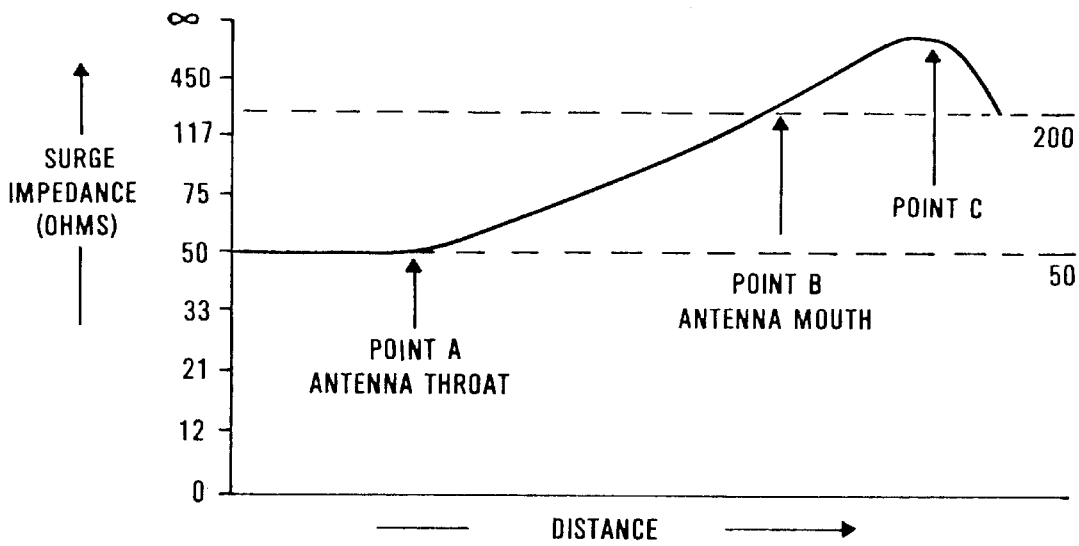
FIG. 2 is a facsimile of the antenna surge impedance through the transmission line and antenna.

If the antenna is fed with a 50 ohm coaxial transmission line. The width and height of the slot at point A (See FIG. 1) is so designed, using standard transmission line design formulas, to force the surge impedance at point A to be exactly 50 ohms. In the initial design of the Bi-Blade Antenna the surge impedance is measured through the transmission line into the feed point of the antenna at point A, progressing through point B, through point C, onto point D. The surge impedance may be measured with a Time Domain Reflectometer or other similar apparatus. A desired Time Domain Reflectometer display of the surge impedance with seen in FIG. 2. Here, the antenna is fed using a 50 ohm coaxial transmission line, and the surge impedance at point A of the antenna is 50 ohms and is linearly increasing to some nominal value, between 180 ohms and 230 ohms at the mouth of the antenna, which is point C in FIG. 1. Using a gradual change in the curvature, the geometry from point C to point D is approximately an arc of constant radius. The radius of the arc is an important design parameter which determines the slope of the surge impedance as seen in FIG. 2 going from point B (the antenna mouth) to point C. If the radius is too small, the slope will be excessive and provide unwanted reflections back to the input (or the feed point) causing a large input VSWR. On the other hand, if the radius is made too large, the physical size of the antenna will become excessive, making the antenna large and bulky. The design compromise which results in the configuration seen in FIG. 1 provides an overall tradeoff between geometry, physical size, and a very good input VSWR. The physical shape or geometry of the blade continuing from point D, to point E, to point F, to point G is relatively unimportant and is made linear or a straight line for manufacturing ease. An extremely low input VSWR (less than 1.1 to 1) can be achieved by making the Bi-Blade Antenna long in the direction of propagation, whereas the input surge impedance is changing slowly with distance.

The manner in which the Bi-Blade antenna is fed with a transmission line is now discussed, (see FIG. 1). When feeding the Bi-Blade Antenna with a balanced transmission line the two wires are attached to points H and I. To assure that the electromagnetic field is contained across the gap with little or no fringing, it is required that the distance from point G to point H and point I to point J be at least 10 times the amount of the slot opening at point H to point I. In practice, it is found that a ratio of 20 to 1 provides both a containment of fringing of the electric lines and, also provides an antenna configuration which gives mechanical rigidity.

Figure 3:
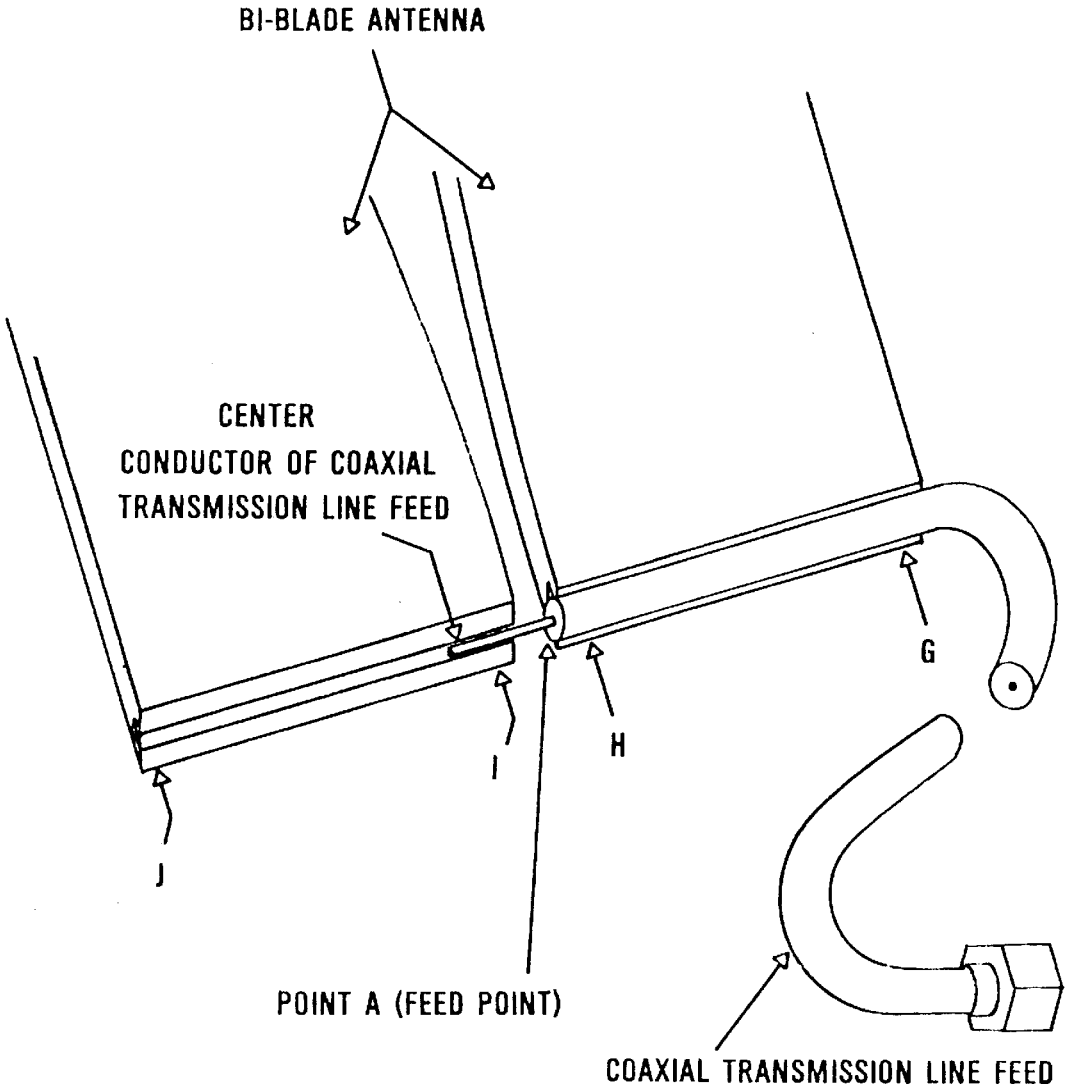
FIG. 3 is an illustration detailing the feeding of the Bi-Blade Antenna with a coaxial transmission line.

FIG. 3 is an illustration of the details of the feeding of the Bi-Blade Antenna of the present invention. When feeding the Bi-Blade Antenna with an unbalanced transmission line such as a coaxial cable, any balun may be employed to provide matching from the unbalanced transmission line to the balance antenna input feed point. Baluns with a bandwidth of a century, (i.e. 100 to 1) may be difficult to construct. A simple and novel means of feeding the balanced Bi-Blade Antenna with a coaxial transmission line without a balun is described with the aid of FIG. 3. Here the outer conductor of the coaxial transmission line is secured (possibly soldered) to the end of one blade as seen in FIG. 3. The center conductor is attached to the other blade, perhaps a sixteenth of an inch or so from the end, and its exact position point is determined by inspecting the surge impedance employing the Time Domain Reflectometer, such that a "surge impedance bump" is trimmed out. For very small diameter coaxial cable transmission line a small dielectric washer may be placed on the center conductor in between the two blades to provide a constant surge impedance in the area where the coaxial cable transmission line is attached to the blades.

Figure 4:
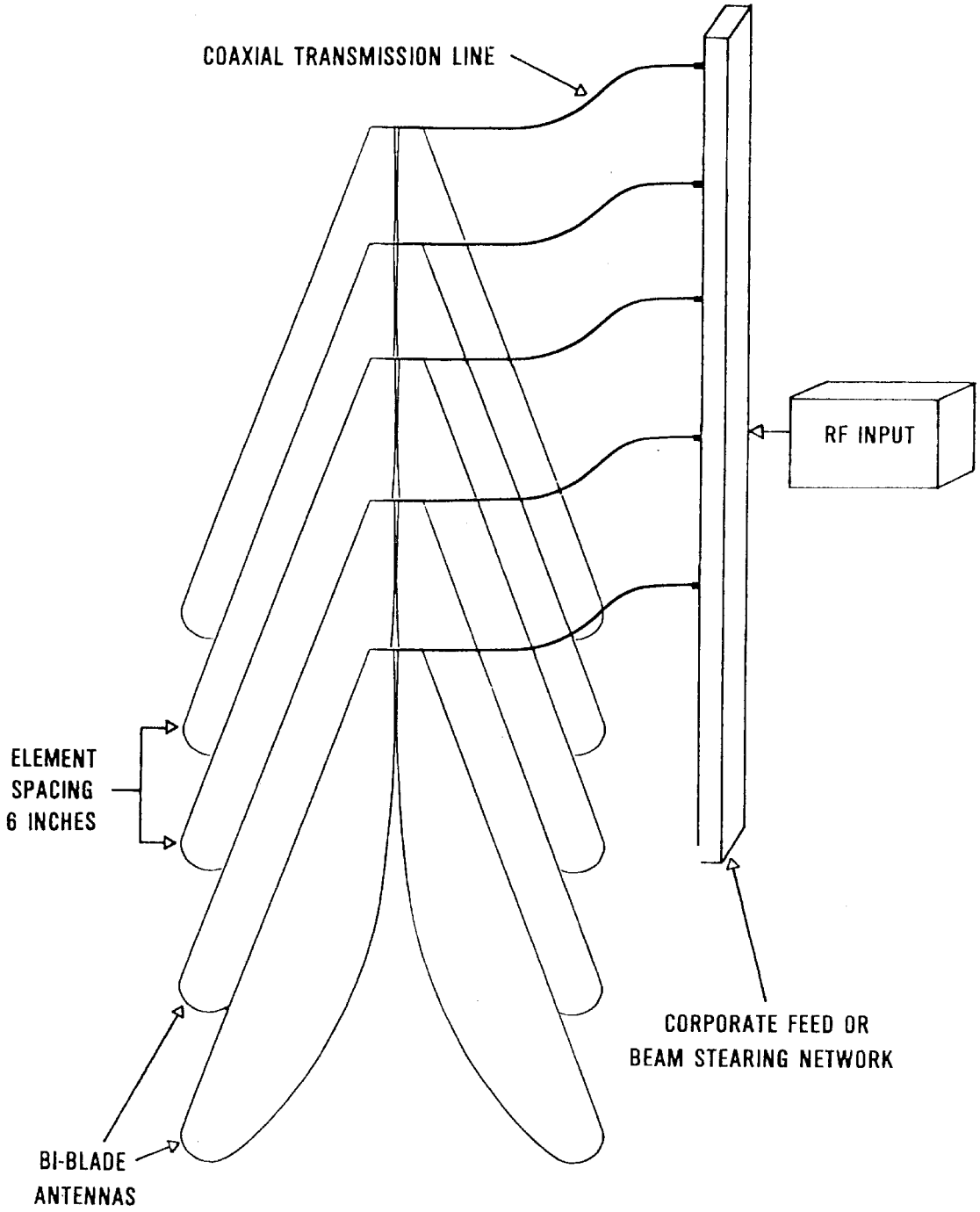
FIG. 4 is an isometric view of vertical arraying of the Bi-Blade Antenna.

The manner in which the Bi-Blade Antenna is supported or attached to a structure can vary according to the particular application. The antenna should be mounted such that no metal be placed near the regions of point A, point B, point C, or point D in FIG. 1. The support structure is generally found to work well when the blades are secured anywhere along the position between points E and F to minimize interference. So far the description of the Bi-Blade Antenna was that of two physical metal blades which are supported by a structure. For ease of manufacture and for mass production, the Bi-Blade Antenna may be manufactured on a printed circuit board (copper clad insulating board) which will provide an inexpensive means of production. This type of construction will lend itself to mass production if one desires to array several of the Bi-Blade Antennas to construct a phased array antenna. The array may consist of antennas mounted in vertical or horizontal stacks, and, for example, an isometric view of vertical arraying of the Bi-Blade Antenna is shown in FIG. 4.

For a typical example, the Bi-Blade Antenna with the dimensions:

Blade Length: 22 inches

Mouth Width: 7 inches

Blade Thickness: 0.1 inches has the measured performance parameters of:

Frequency: 8 GHz

Gain: 16.2 dB

Vertical Beamwidth: 19 degrees

Horizontal Beamwidth: 50 degrees

VSWR: 1.19 to 1

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An antenna comprising:

first and second blade antenna elements fixed in proximity with each other; and a coaxial transmission line feed which has a central conductor connected with said first blade antenna element, said coaxial transmission line feed having an outer conductor connected with said second blade antenna element.

2. An antenna as defined in claim 1, wherein said first and second blade antenna elements each comprise:

a blade element which has a throat, a mouth, and a tip, said throat serving as a feed point and being electrically connected to said coaxial transmission line feed and being comparatively narrow compared to the mouth, the mouth being a mid-section of said blade and being the blade's widest point, and the tip being an area of constant radius, said tip thereby resulting in a low voltage standing wave ratio of about 1.19 to 1.

3. An antenna, as defined in claim 2, wherein said antenna includes an array of first and second blade antenna elements fixed in proximity with each other and fed with a plurality of coaxial transmission line feeds, each of said coaxial transmission line feeds having a central conductor connected with one of said first blade antenna elements, and an outer conductor connected with said second blade antenna element.

4. An antenna, as defined in claim 3, where each of said first and second blade antenna elements has a length of about twenty two inches; a mouth width of about seven inches, and a width of about 0.1 inches.

* * * * *